United States Patent
Lacombe et al.

(10) Patent No.: US 10,675,605 B2
(45) Date of Patent: Jun. 9, 2020

(54) OPTIMIZED AGITATOR SYSTEM FOR PRODUCTION OF POLYOLEFIN

(71) Applicant: NOVA Chemicals (International) S.A., Fribourg (CH)

(72) Inventors: Yves Lacombe, Calgary (CA); Eric Clavelle, Calgary (CA); Stephen Salomons, Calgary (CA); Andrew Hawryluk, Calgary (CA); Stephen John Brown, Calgary (CA); Marion Walls, Red Deer (CA)

(73) Assignee: NOVA Chemicals (International) S.A., Fribourg (CH)

( * ) Notice: Subject to any disclaimer, the term of this patent is extended or adjusted under 35 U.S.C. 154(b) by 138 days.

(21) Appl. No.: 15/537,026

(22) PCT Filed: Jan. 4, 2016

(86) PCT No.: PCT/IB2016/050025
§ 371 (c)(1),
(2) Date: Jun. 16, 2017

(87) PCT Pub. No.: WO2016/110795
PCT Pub. Date: Jul. 14, 2016

(65) Prior Publication Data
US 2017/0361301 A1    Dec. 21, 2017

Related U.S. Application Data

(60) Provisional application No. 62/101,082, filed on Jan. 8, 2015.

(51) Int. Cl.
*C08F 10/02* (2006.01)
*C08F 2/01* (2006.01)
(Continued)

(52) U.S. Cl.
CPC .......... *B01J 19/1837* (2013.01); *B01J 19/18* (2013.01); *C08F 2/01* (2013.01); *C08F 4/76* (2013.01); *C08F 210/16* (2013.01); *B01J 2219/00166* (2013.01); *B01J 2219/00189* (2013.01); *C08F 10/02* (2013.01); *C08F 2400/02* (2013.01); *C08F 2500/08* (2013.01); *C08F 2500/12* (2013.01)

(58) Field of Classification Search
None
See application file for complete search history.

(56) References Cited

U.S. PATENT DOCUMENTS

| | | | |
|---|---|---|---|
| 6,024,483 A | 2/2000 | Burke et al. | |
| 6,319,996 B1 | 11/2001 | Burke et al. | |
| 2007/0027276 A1* | 2/2007 | Cann | C08F 210/16 526/95 |

FOREIGN PATENT DOCUMENTS

CA    2193431    6/1998

OTHER PUBLICATIONS

Chau, J. and Teh, J.;Successive Selt-Nucleation and Annealing in the Solvated State of Ethylene Copolymers; Journal of Thermal Analysis and Colorimetry, vol. 81 (2005), pp. 217-223.

* cited by examiner

*Primary Examiner* — Richard A Huhn
(74) *Attorney, Agent, or Firm* — Lawrence T. Kale

(57) ABSTRACT

The various embodiments of the present invention relate to a polymerization reactor where the agitator mixing performance is optimized for use with a high activity catalyst and methods for developing the same.

25 Claims, 6 Drawing Sheets

(51) Int. Cl.
*C08F 4/76* (2006.01)
*B01J 19/18* (2006.01)
*C08F 210/16* (2006.01)

OPTIMIZED AGITATOR SYSTEM FOR PRODUCTION OF POLYOLEFIN

TECHNICAL FIELD

The various embodiments of the present invention relate to slurry or solution polymerizations in a reactor or reactor system having the properties of a continuously stirred tank reactor (CSTR) such as a CSTR system and a loop reactor system where the mixer (e.g. agitator, pump, impeller or static mixer as the case may be (hereinafter referred to as the agitator) performance is optimized for use with one or multiple catalyst systems and the methods of developing and using the same.

BACKGROUND

Some catalyst systems may require a reactor with high agitation performance due to faster kinetics of the polymerization processes. Poor mixing performance may lead to reactor instability and poor product quality. For example the molecular weight distribution (MWD) may show broadening or there may be gel formation in the final polymer. For a given reactor and agitator system design, the range of products (e.g. product slate) that can be made in that set-up will also be limited by the reactor mixing performance.

While simply increasing agitation speeds is one option for achieving high mixing performance, this method has the disadvantages of higher expenses related to energy consumption, higher likelihood of damage to, or failure of, the agitators and/or seals if they are overworked, and an inability to understand the product sensitivity to small changes in agitator speeds. Some catalyst systems are less sensitive to the mixing performance of the reactor system. Therefore, there is an opportunity to optimize mixing to achieve one or more of reduced energy consumption in the reactor system; improved polymer consistency; broadened product slate; and improved translation or correlation of operation and procedures from one reactor system to another.

DISCLOSURE OF INVENTION

Some embodiments of the invention disclosed herein are directed to the development of a polymerization reactor where the agitator mixing performance is optimized for use with a desired catalyst system.

Some embodiments of the invention disclosed herein are directed to the identification and correlation of mixing performance indicators to establish a minimum performance threshold to ensure stable reactor operation over a wide range of conditions and maintain product quality and scalability.

In addition some embodiments of the invention disclosed herein are directed to a method of determining optimal agitator speeds and mixing conditions in lab-scale and pilot plant scale reactors that can be correlated to commercial scale reactor conditions.

Provided herein are methods for fluid phase polymerizing a polyethylene polymer or copolymer comprising reacting a polymerization catalyst having an apparent activity greater than 20,000 m$^3$/kmole/sec with ethylene, optionally a $C_{3-12}$ α-olefin, and hydrogen in an agitated reactor wherein the reactor HUT/BT is greater than 7 and the reactor circulation ratio is between about 7 and about 2000.

Provided herein are methods for fluid phase polymerizing a polyethylene polymer or copolymer comprising reacting a polymerization catalyst having an apparent activity greater than 20,000 m$^3$/kmole/sec with ethylene, optionally a $C_{3-12}$ α-olefin, and hydrogen in an agitated reactor wherein the reactor HUT/BT is greater than 4, reactor circulation ratio is between about 7 and about 2000, and the power/unit volume is less than 35 kW/m$^3$.

Also provided herein are methods for selecting agitator speed to reduce the cost of operating a CSTR or increasing capacity in a CSTR comprising a. measuring the HUT/BT and circulation ratio of the reactor, b. measuring the mixing performance indicator of the final polymer product, c. plotting the HUT/BT and circulation ratio versus the performance indicator, d. varying the agitator speed or HUT to get a new HUT/BT and circulation ratio, e. repeating steps a-d until the plotted line of step c shows a roughly horizontal lines (asymptote), and f. lowering the agitation rate of the reactor for commercial polyethylene polymerization so the mixing performance falls within a "Zone II" or "Zone III" region on each plot from step c. (i.e. product is of acceptable quality), g. operate the CSTR reactor using the identified agitation speed.

Also provided herein are methods for transferring reaction conditions for an ethylene polymerization process from one plant to another comprising a. measuring the HUT/BT and circulation ratio of a reactor system for the desired product, b. setting up the reaction conditions in the new reactor to match the HUT/BT and meet or exceed the circulation ratio measured in step a.

Also provided herein are methods to improve the range of products that can be produced in a reactor system comprising:

a. determine desired product characteristics and process conditions by modeling, b. calculate or determine the HUT/BT and circulation ratio of the reactor system, c. iteratively vary the reactor process conditions to get a new HUT/BT and circulation ratio in the model, d. select the operating conditions that provide the desired determined product characteristics, and e. run the process.

BEST MODE FOR CARRYING OUT THE INVENTION

Figure 1:
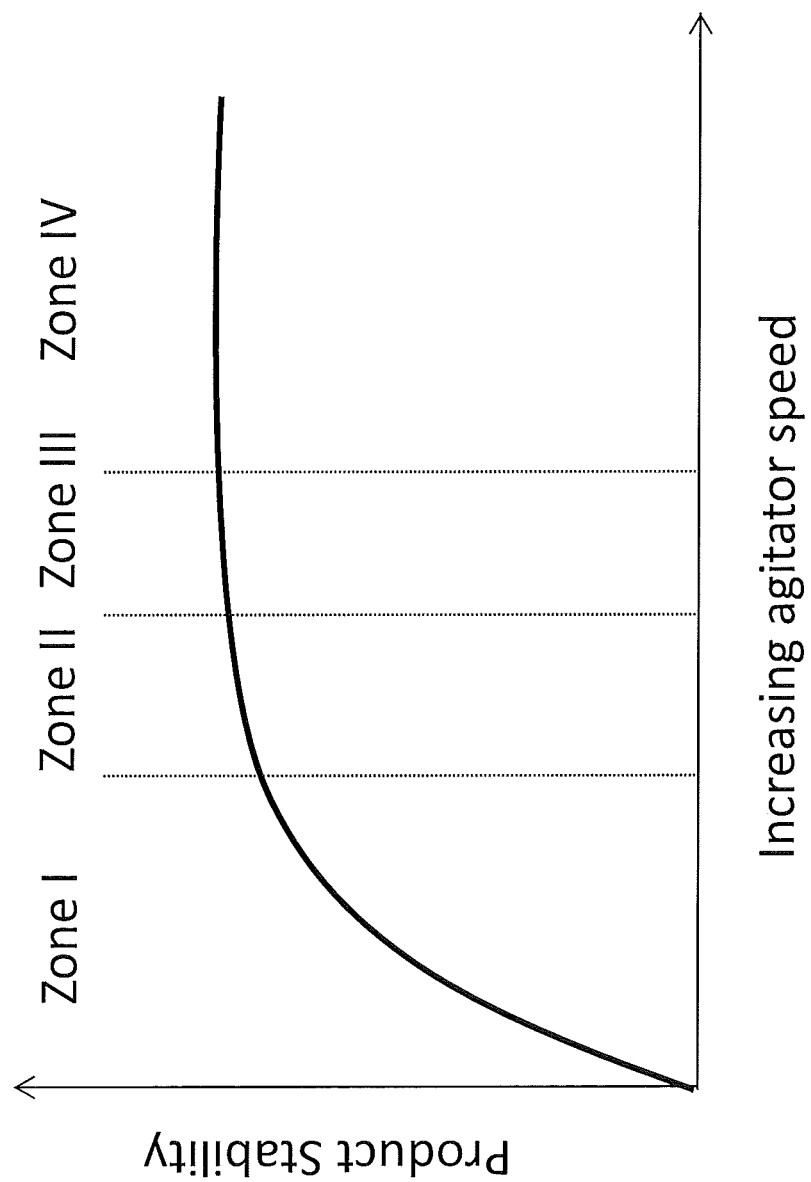
FIG. 1: Schematic diagram showing reaction/product stability as a function of agitator speed (mixing performance) from low to higher speeds.

Other than in the operating examples or where otherwise indicated, all numbers or expressions referring to quantities of ingredients, reaction conditions, etc. used in the specification and claims are to be understood as modified in all instances by the term "about". Accordingly, unless indicated to the contrary, the numerical parameters set forth in the following specification and attached claims are approximations that can vary depending upon the desired properties, which the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations and are subject to the descriptions of the previous paragraph.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, the amounts of the components actually used will conform to the maximum of 100 percent.

A continuously stirred tank reactor (CSTR)—also known as (but not limited to) a mixed or mixed flow reactor, or back-mixed reactor, or constant flow stirred tank reactor (CFSTR)—is one of three typical classifications for reactor design and modeling. The other two are a batch or semi-batch reactor (BR) and a plug flow reactor (PFR). As the name implies, a BR in its ideal form has its reactants injected at the beginning with the reaction taking place b for the required period of time at which point the products are withdrawn. The BR chemical composition varies in time but is uniform throughout the reactor at any instant in time. A PFR is a continuous flow reactor typically tubular in geometry with a continuous injection of reactants at one end and products withdrawn at the other end. The PFR has a continuously varying chemical composition through its length. A CSTR in its ideal realization is a well stirred tank with reactants continuously injected in one location and products withdrawn continuously in another location. The chemical composition within the reactor is uniform in space and time and equal to the chemical composition at the exit.

No real reactor is exactly represented by the CSTR, BR or PFR. These classifications are used to model in the ideal sense how a chemical reactor behaves or operates. A real reactor will be best represented conceptually by one of these three reactor types for the purposes of modeling and general understanding of their operation. The descriptions of the ideal reactor types do not necessarily describe the physical or geometric realization of a reactor. A CSTR can be a typical tank or reaction volume stirred by an impeller rotating at some speed; however, any configuration that is well mixed throughout its reaction volume with a continuous injection of reactants and withdrawal of products is within the category of CSTR. For example, a reactor composed of flow loop with sufficient circulation and internal mixing to be essentially uniform is classified as a CSTR. This loop may be composed of pump(s) or fluid motive driver(s) and any combination of piping, static mixers or tanks. All three reactors can operate with liquid, gas or multi-phase (for example, solid-liquid, liquid-liquid or liquid-gas). While not wishing to be bound by theory it is believed that gas phase reactors could also be operated in accordance with the present invention. In theory the fluidized bed of a gas phase reactor operates in a manner comparable to a CSTR. A CSTR as defined here can operate adiabatically or non-adiabatically.

An ideal CSTR is described as being well mixed such that the bulk reactor volume chemical composition is equal to that of the exit. In practice, no real reactor can achieve this ideal. The deviation from ideal can be detrimental or beneficial. The ability to predict a priori the deviation from ideal is of scientific and commercial benefit. The term "well mixed" is subjective but can be more clearly described as the rate of mixing being sufficiently faster than the relevant chemical reaction rates such that the mixing (or spatial composition) has minimal or acceptable impact on the intended product. This can be mathematically described using the Damkoehler number which is defined as the ratio of the speed of chemical reaction to that of the speed of mixing. However, there has been no universal means to calculate the Damkoehler number for a CSTR being used for polymerization reactions in order to predict the impact on the reactor product or to use in scaling from one reactor size to another.

The non-ideal behavior of a real CSTR can be modeled by representing the real CSTR as a combination of ideal a CSTR(s) and an ideal PFR(s) in parallel and/or series and with circulation back to any one of these ideal reactor representations. This is the so called compartment models. The overall system represented by this combination of ideal models is still a CSTR conceptually. Additional mixing parameters can be derived from the compartment model, for use in capturing meso- and micro-mixing effects.

Definitions

Units are in SI unless otherwise stated.

| | | |
|---|---|---|
| $A_f$ | catalyst activity factor | — |
| BT | blend time | s |
| Da | Damkoehler number | — |
| $Da_{bulk}$ | bulk Damkoehler number | — |
| Dab | bulk Damkoehler number | — |
| $Da_p$ | pumping Damkoehler number | — |
| Dap | pumping Damkoehler number | — |

| | | |
|---|---|---|
| HUT | reactor hold-up time = θ | s |
| $k_p$ | propagation rate constant | m³/kmole/s |
| $k_p^*$ | apparent catalyst activity | m³/kmole/s |
| ṁ | total mass flow through reactor | kg/s |
| ṁPE | polymer mass flow rate | kg/s |
| ṁC₂ | ethylene feed mass flow rate | kg/s |
| ṁC$_x$ | co-monomer feed mass flow rate | kg/s |
| $M_{w\,cat}$ | molar mass of the catalyst metal | kg/kmole |
| $M_{ppm}$ | concentration of catalyst metal in the polymer | ppm by mass |
| N | agitator speed | rpm |
| Q | monomer fractional conversion | — |
| $Q_c$ | combined fractional monomer and co-monomer conversion | — |
| TSR | total solution rate = total mass flow rate through reactor | kg/s |
| $V_{Rx}$ | Reactor volume | m³ |
| $\dot{V}_f$ | total volumetric flow rate through the reactor | m³/s |
| $\dot{V}_p$ | internal pumping or circulating flow | m³/s |
| θ | reactor hold-up time = HUT | s |
| ρ | fluid density within reactor volume | kg/m³ |
| $\tau_{mix}$ | mixing time | s |
| $\tau_{rx}$ | reaction time | s |
| $\tau_{Rx}$ | reaction time specific to a CSTR as defined in this document | s |
| $\tau_{95}$ | blend time | s |
| [m] | catalyst molar concentration | kmol/m³ |

The blend time (BT or $\tau_{95}$) is a common reactor mixing time measure of the macro, or large scale, mixing of the bulk reactor contents. It is defined as the time required for the bulk contents of the reaction volume to be 95% mixed. There are many ways to characterize the blend time in both a laboratory and industrial setting, though it is typically performed at laboratory scale and through well understood scaling principles scaled-up to the industrial scale. Examples include but are not limited to the injection of salt solutions, temperature pulses or fluorescing dyes and measuring with a probe (or more accurately multiple probes) the time evolution of the concentration or temperature. For this example, the time at which all measurement probes read within 95% to 105% of the final value is defined as the blend time. Numerous techniques have been established and documented in mixing literature for experimentally determining the blend time. Correlations for the various mixing systems are also published in the literature.

Reactor internal circulation rate or circulation rate is most easily visualized in a reaction system with a clear circulation path. For example, a reaction vessel with a draft tube and impeller will result in a clear circulation path or loop of the bulk fluid flow. Similarly, a loop reactor composed of a piping loop, static mixer and pump will have a clear circulation path. With both of these examples, the circulation rate can be measured by numerous means. A reactor composed of an impeller or system of impellers will have internal circulation but can be more difficult to visualize and measure. However, there are multiple direct and indirect means to do so. For example, in a vessel with an agitator, techniques such as Laser Doppler Velocimetry (LDV) or Particle Image Velocimetry (PIV), well understood by one knowledgeable in experimental mixing, could be used to map a velocity profile on a planar cross-section of the reactor normal to the agitator's axis of rotation. By mathematically integrating the velocity crossing each portion of the measurement plane in a single normal direction (positive or negative) the circulation through the plane could be determined. Computational fluid dynamics could also be used as it provides a three dimensional map of velocity within the reaction domain from which circulation into and out of various regions could be ascertained. Methods such as these, and many others, can be used to calculate global or local circulation within a reactor.

Bulk Mixing Efficiency (Uniformity)

With all other parameters (such as catalyst type, temperatures, reactants and quantities of reactants, and the like) remaining constant in a polyethylene polymerization reactor system, and for the purposes of this application, there are essentially four mixing performance zones within which a reactor system can operate. When agitation speeds are too low, mixing is poor and there is little to no predictability in the type or quality of product that is made. Small changes in agitation speed likely result in a different product (going up the highly curved part of the slope) and poor reaction stability which may lead to reaction upset and/or loss of reaction. This is shown qualitatively in FIG. 1 as Zone I. At the edge of performance stability, there is some predictability in the type or quality of product that is made but small changes in the mixing speed or quality could result in product falling outside of the desired specifications. This is shown qualitatively in FIG. 1 as Zone II. Within the third region the conditions allow predictability in the type or quality of product and small changes in the mixing conditions to do not affect the product in a negative way. This is shown qualitatively in FIG. 1 as Zone III. Finally, in the fourth region, all of these positive conditions remain, but the agitator speed is high and the energy consumption of the reactor may cause the product to become too expensive and/or the agitator can be over worked causing premature damage to the agitator or worse complete failure of the agitator. This is shown qualitatively in FIG. 1 as Zone IV.

Agitation speed can be modified by changing agitator speed (i.e. impellors, mixers), or by increasing the number of static mixing elements, or by changing the circulation pump flow rate in reactors whose mixing elements are stationary. Specific discussions in this disclosure that mention changes in agitator speed in a CSTR are also meant to include more generically any changes to agitation speed that can be accomplished by the methods mentioned herein or by any method known in the art.

Figure 3:
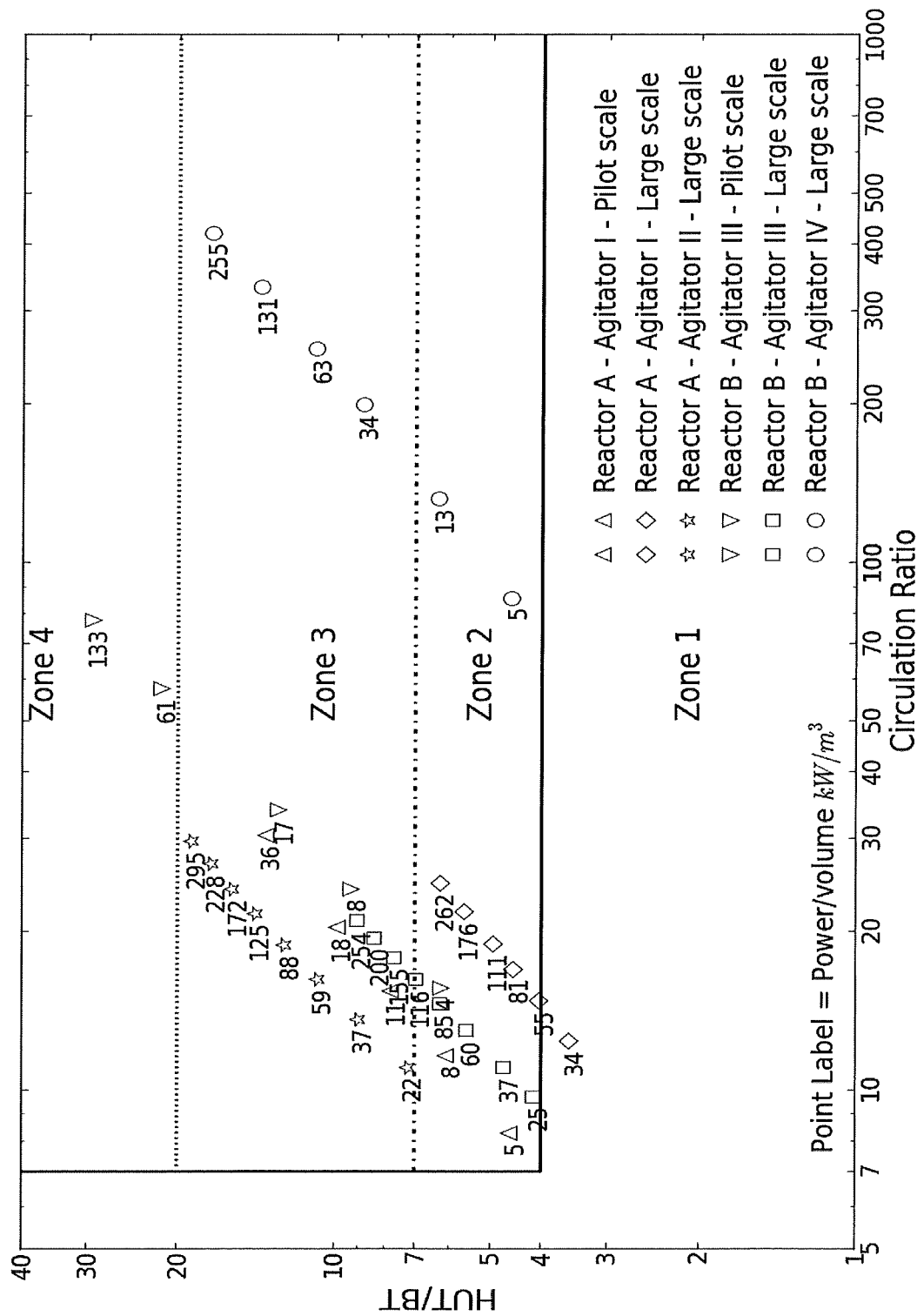
FIG. 3: Plot of reactor hold up time (HUT)/Blend time (BT) against the circulation ratio for different combination of reactor geometry, scale and agitator types. The point labels on the figures are the power/volume at a given set of operating conditions. The figure also shows operating stability zones from FIG. 1.
Figure 4:
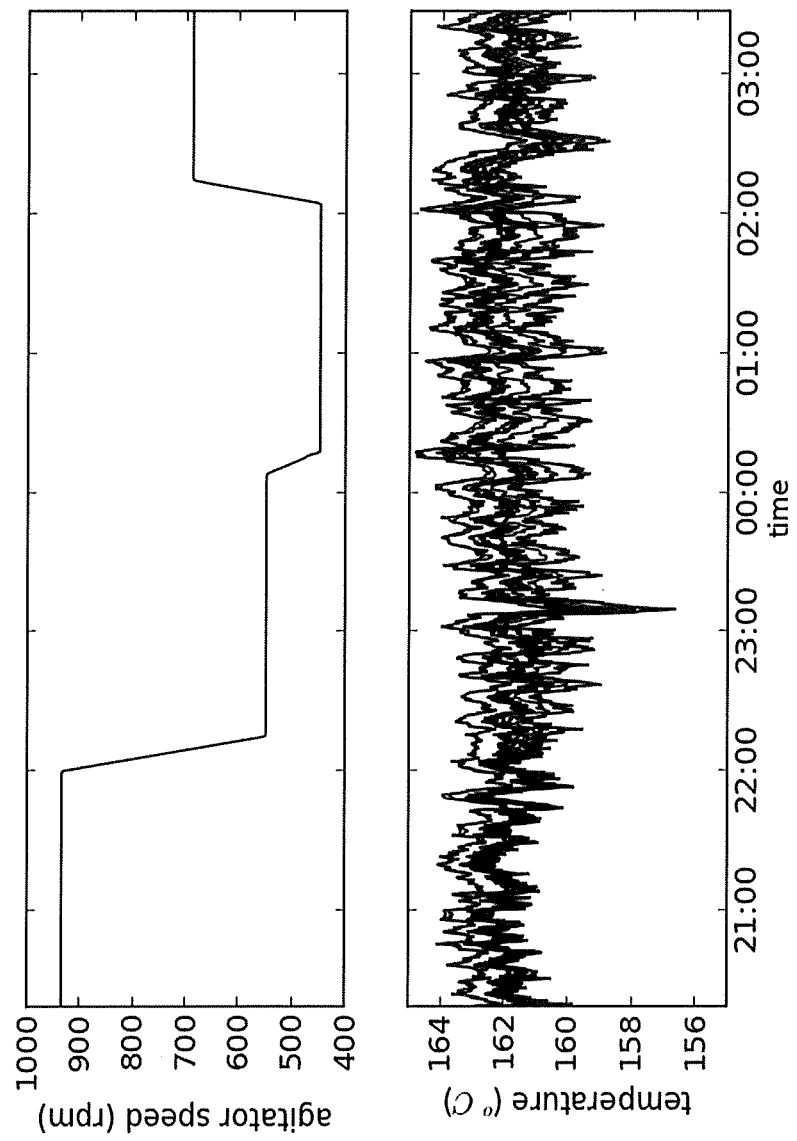
FIG. 4: Process trend plot of agitator speed and reactor temperatures for operating conditions of Example 2A.

The above is also illustrated in FIG. 3. Increasing the agitator speed (i.e. power/volume) for a fixed reactor geometry and agitator type will result in increased circulation ratio and HUT/BT ratio. Operating in Zone 3 is more desirable since the mixing performance and scale-up will be more predictable. However, it may not be practically possible to operate in Zone 3 for some combination of reactor geometry, agitator type and scale. For example, increasing the power input per unit volume from 5 to 36 kW/m³ for Reactor A with Agitator I at pilot scale will move the reactor operating stability from Zone 2 to Zone 3. Operating the same reactor geometry and agitator type at a larger scale (Reactor A-Agitator I—Large scale) requires much more power per unit volume. In this case, 34 kW/m³ is not sufficient to achieve the desired reactor operating stability. If power is increased to 55 kW/m3, the reactor can operate in Zone 2 and make products with acceptable quality. For this system, increasing power input to 262 kW/m³ is not sufficient to operate in Zone 3.

It may be possible in some cases to operate in Zone 3 at large scale with an acceptable power per volume input. For example, Reactor A with Agitator II at large scale can operate in Zone 3 with power inputs that are comparable to Reactor A with agitator I. Operating in Zone 4 would require power input per unit volume higher than 295 kW/m³, which is not practical and economical. Designing a reactor system to operate in Zone 3 provides additional operating stability buffer to push process conditions and expand the product capability of a reactor system.

Figure 2:
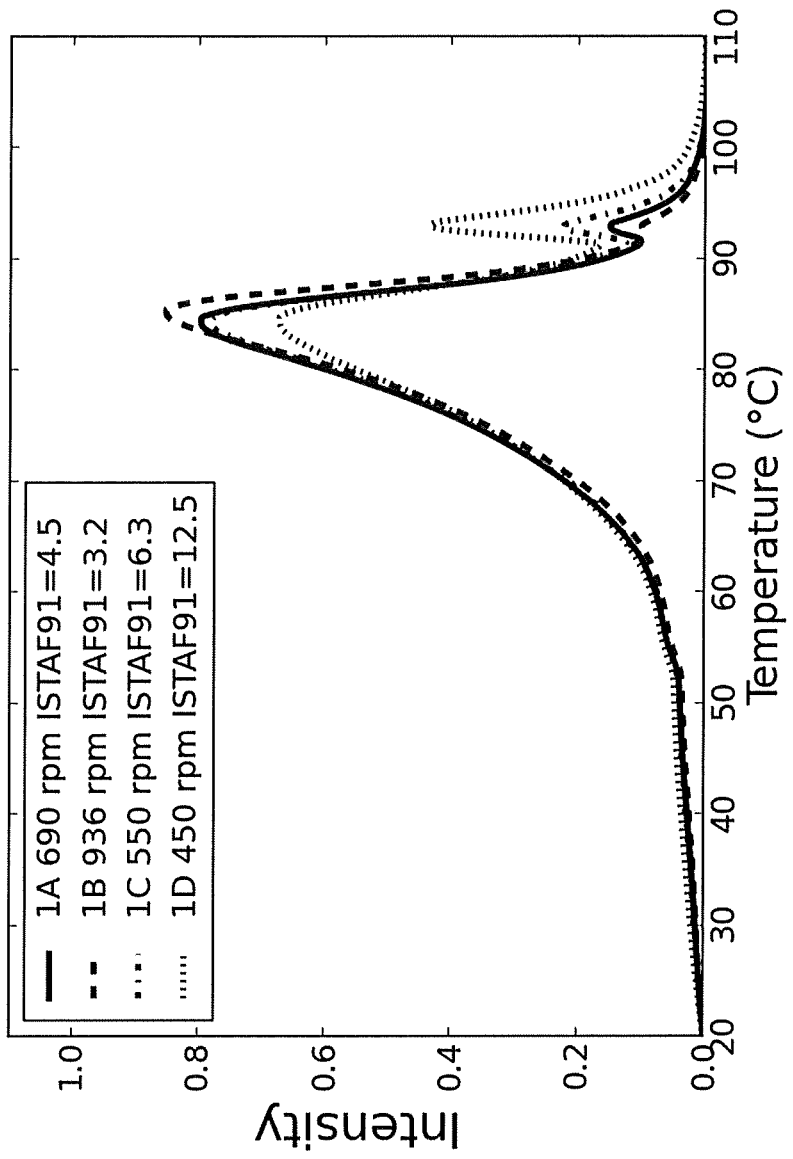
FIG. 2: Series of overlays of SSA-STAF for the same product made at different agitator speed using the same catalyst system and composition of reactants at different agitator speeds. The particular product has a peak above 91° C. that is responsive to mixing efficiency.

The mixing performance of a reactor system can be described in a number of ways. By definition, mixing is the reduction of inhomogeneity in order to achieve a desired process results. The mixing performance of an agitator system is determined by the production rate, reaction rate, reactor geometry, agitator design and agitator speed. The mixing performance may be influenced by the relative time scales of the mixing process (mixing time) relative to the time scale of the reaction taking place in the reactor system. The mixing performance can be characterized using numerous performance indicators. These can be obtained from detailed agitator system characterization (i.e. agitator blend time) and also obtained from the reactor process parameters (temperature gradient, composition gradients). For some catalyst systems the mixing performance may have an influence on the resin architecture and product quality (as shown in FIG. 2). Such catalyst systems are useful tools to understand the relationship between the mixing time scale and the reaction time scale. The mixing performance can be characterized using dimensionless parameters, which enables the comparison of mixing performance for different agitator systems, catalyst systems and scale. Those mixing parameters can then be correlated with process stability and product quality to determine the acceptable range for operating a reactor system. It is desirable to have a reactor system operating under conditions which have a low mixing sensitivity. Increasing mixing performance may make the process less sensitive to rate change and/or improve product quality and/or improve product consistency. This may also then reduce the risk of reactor upsets (temperature splits) and improve product quality (reduce gels, high MW tails). Better mixing also increases the product capability of a given process, by expanding the limits of process conditions while maintaining acceptable process stability and product quality. However, there is also a desire to keep agitator speeds as low as possible to minimize wear on the agitator and to keep energy consumption as low as possible.

It can be difficult to identify this FIG. 1 Zone III especially if the production of a product is moved to a new reactor or as development occurs through various reactors (lab scale, to pilot scale, to commercial scale). Disclosed herein are dimensionless parameters and methods that can be used to identify mixing conditions that optimize product stability and agitator speeds in any reactor for high activity catalytic systems.

"Mixing Performance Indicators"

Poor mixing performance leads to reactor instability and poor product quality, which manifest as temperature splits, MWD broadening and/or gel formation in the final product. A mixing performance indicator, for the purposes of this application, is a characteristic of the polymer product that shows a measurable variation with mixing performance. In one example, as the mixing performance improves, this characteristic of the polymer product changes more rapidly than other characteristics of the polymer. The impact of mixing performance on the product quality is illustrated in FIG. 2, which shows an overlay of Successive Self-Nucleating Annealing-Solvated Thermal Analysis Fractionation, (SSA-STAF) graphs for single reactor products made at different agitator speed using a high activity catalyst system. Poor mixing of the reactor fresh feed, characterized by a localized higher ethylene concentration relative to octene (adjacent the inlet), results in the production of higher molecular weight (tail in molecular weight distribution) and higher density material. To provide an indication of the amount of higher density material produced in the reactor, the SSA-STAF curves were integrated above 91° C. (ISTAF91) for each product and values are reported at the upper left of the figure. A detailed description of SSA-STAF analysis is provided in Journal of Thermal Analysis and Calorimetry, Vol 81 (2005) 217-223 Successive Self-Nucleation and Annealing in the Solvated State of Ethylene Copolymers by Joo Teh and Joyce Chau.

Other measures of mixing sensitivity could be substituted for SSA-STAF, such as GPC, NMR, FTIR, and the like. The goal is to find a product characteristic that shows a measurably significant change with increased agitator speeds or circulation ratios. As will be discussed below, this will allow for a correlation between a dimensionless reactor parameter that gives an indication of mixing performance and the final product quality.

The mixing performance of a reactor agitator system can be characterized using various forms of dimensionless ratios. A dimensionless parameter comparing (i) the speed of mixing to (ii) the speed of chemical reaction is commonly defined as the Damkoehler number:

$$Da = \frac{\tau_{mix}}{\tau_{rx}} \tag{1}$$

where $\tau_{mix}$ is the mixing time (s) and $\tau_{rx}$ is the reaction time (s). Numerous definitions and combinations of these two speeds or times can be formed. The design equations for a continuously stirred reactor (CSTR) enable the development of a mathematical expression for the reaction time based on fundamental kinetic parameters and measurable parameters. This is discussed below.

For a second order reaction with two reactants, such as catalyzed polymerization reaction, the reaction time is defined by:

$$\tau_{Rx} = \frac{1}{k_p[m]} \tag{2}$$

where $k_p$ is the propagation constant (m³/kmole s), and [m] is the catalyst molar concentration in the reactor (kmole/m³).

For olefin polymerization in a CSTR, the polymerization rate consists of ratios of multiple propagation rate over catalyst deactivation rate. However, the kinetics scheme can be simplified by using the approximation of apparent catalyst activity:

$$k_p^* = \frac{1}{[m]\theta}\left(\frac{Q}{1-Q}\right) \tag{3}$$

where $k_p^*$ is the apparent catalyst activity (m³/kmole s), θ is the hold-up time in the reactor (s), [m] is the catalyst concentration in the reactor (kmole/m³) and Q is the monomer fractional conversion.

For copolymerization, it is more useful to define $Q_c$ as the combined monomer conversion. The combined conversion is easily calculated from the polymer production rate and the total monomer feed rate:

$$Q_c = \frac{\dot{m}PE}{\dot{m}C_2 + \dot{m}C_x} \tag{4}$$

The hold-up time is defined as the reactor volume over the feed volumetric flow rate:

$$HUT = \theta = \frac{V_{Rx}}{\mathbb{V}_f} \quad (5)$$

To compare mixing performance between catalyst systems, an additional factor is required to scale by catalyst activity. $A_f$ is defined as follow:

$$A_f = \frac{|k_p^*|_1}{|k_p^*|_2} \quad (6)$$

where $|k_p^*|_1$ and $|k_p^*|_2$ are the apparent catalyst activity for two catalyst systems defined under similar conditions.

Using Equation (3) above, we can define chemistry time as:

$$\tau_{Rx} = \frac{1}{k_p^*[m]} = \theta\left(\frac{1-Q_c}{Q_c}\right) \quad (7)$$

Numerous versions of Damkoehler numbers can be developed to characterize the mixing performance of a reactor system. The bulk Damkoehler number is defined as the ratio of the reactor blend-time ($\tau_{95}$) over the previously defined chemistry time ($\tau_{Rx}$). The bulk Damkoehler number is given by:

$$Da_{bulk} = \frac{\tau_{95}}{\tau_{Rx}} = \left(\frac{Q_c}{1-Q_c}\right)\left(\frac{\tau_{95}}{HUT}\right) \quad (8)$$

When comparing mixing performance for multiple catalyst systems, an additional scaling factor ($A_f$) is included in the bulk Damkoehler:

$$Da_{bulk} = \frac{\tau_{95}}{\tau_{Rx}} = \left(\frac{Q_c}{1-Q_c}\right)\left(\frac{\tau_{95}}{HUT}\right)A_f \quad (9)$$

where $\tau_{95}$ is the blend time.

Another parameter useful in measuring the mixing performance of a reactor system is the internal circulation or "pumping" capacity. The pumping capacity is the internal circulation flow. The pumping time ($\tau_P$) is defined as the ratio of the reactor volume to internal pumping flow $$\tau_P = \frac{V_{Rx}}{\mathbb{V}_p} \quad (10)$$

The circulation ratio is defined as the ratio of internal pumping flow over the reactor feed flow:

$$\text{Circulation Ratio} = \frac{\mathbb{V}_p}{\mathbb{V}_f} \quad (11)$$

where $\mathbb{V}_p$ is the internal pumping rate (m³/s) and $\mathbb{V}_f$ is the reactor feed flow (m³/s). The pumping Damkoehler number can be written as:

$$Da_p = \frac{V_{Rx}}{\mathbb{V}_p}\frac{1}{\theta}\left(\frac{Q_c}{1-Q_c}\right) \quad (12)$$

The pumping Damkoehler number can also be written in terms of circulation ratio by replacing the hold-up time ($\theta$) using equation (5):

$$Da_p = \frac{\mathbb{V}_f}{\mathbb{V}_p}\left(\frac{Q_c}{1-Q_c}\right) \quad (13)$$

When comparing mixing performance for multiple catalyst systems, an additional scaling factor ($A_f$) is included in the bulk Damkoehler:

$$Da_p = \frac{\mathbb{V}_f}{\mathbb{V}_p}\left(\frac{Q_c}{1-Q_c}\right)A_f \quad (14)$$

By definition, better mixing is achieved when the mixing time is much smaller than the chemistry time. Therefore, better mixing is achieved with smaller Damkoehler number. In general, it is more practical to use the inverse of the Damkoehler number when discussing mixing performance: higher values meaning better mixing. In this case, the inverse of the Damkoehler number is defined as the mixing rate over the chemistry rate.

$$\frac{1}{Da_{bulk}} = \frac{\theta}{\tau_{95}}\left(\frac{1-Q}{Q}\right)\frac{1}{A_f} \quad (15)$$

$$\frac{1}{Da_p} = \frac{\mathbb{V}_p}{\mathbb{V}_f}\left(\frac{1-Q}{Q}\right)\frac{1}{A_f} \quad (16)$$

The Damkoehler number and inverse unction described in Equation 9, 14, 15 and 16 are general and can be applied for various reactor and catalyst systems. Simplified versions of those dimensionless parameters can be utilized to evaluate and/or compare the mixing performance of reactor systems with different designs or scales, especially when process conditions or catalyst systems are constant. For example, if the process parameters are held constant, which is typical when comparing products made at different scales with the same catalyst system, the inverse of the bulk Damkoehler number simplifies to the hold-up time to blend time ratio (HUT/BT or $\theta/\tau_{95}$). Similarly, the inverse pumping Damkoehler number can be simplified to the circulation ratio ($\mathbb{V}_p/\mathbb{V}_f$).

In other instances, it is necessary to include the combined conversion term $$\left(\frac{Q_c}{1-Q_c}\right)$$

to capture the impact of different process conditions on the mixing parameters. Products made at higher conversion (higher production rate) are more challenging to produce than grades made at lower conversion. The combined conversion also enables comparing mixing sensitivity of grades made with different conversions and/or amount of comonomer Typically, power per unit volume (P/V) is used to scale from one reactor scale to another. This method results in reasonable mixing power increase as the reactor volume is increased and because it is related to local or micro-mixing. Constant blend time between scales is another scaling method in particular for fast reactions but often results in a significant sometimes impractical or economically unrealistic power increase. Typically, but not always, scale-up methodologies maintain geometric similarity.

The Damkoehler numbers can be calculated for other reactor types in addition to a CSTR using methods well known by those skilled in the art polyethylene polymerization methods.

In one embodiment, a continuously stirred reactor system, two mixing parameters, hold-up time to blend time ratio and the ratio of internal circulation flow rate to fresh feed flow rate (or the Circulation Ratio) can be used to characterize the mixing conditions of the reactor. These parameters are a function of the agitator system geometry and Reynolds number. Variants of both of these dimensionless ratios have been used, e.g. bulk Damkoehler number and pumping Damkoehler number. The combination of these two parameters, one of which describes the balance between mixing and reaction speed and the other which describes the bulk motion of fluid relative to the flow through the reactor, can be used to identify the preferred operating mixing regime in any reactor size.

In another embodiment, a continuously stirred reactor with an internal draft tube, the same two mixing parameters HUT/BT and circulation ratio can be used to identify the preferred mixing zones in any reactor size for a given polymerization catalyst and process. Variants of these two dimensionless parameters can be applied to describe the balance of mixing speed and reaction speed.

In one embodiment, the reactor HUT/BT is greater than about 4. In other embodiments, the reactor HUT/BT is greater than about 6, or is greater than about 8 or is greater than about 10, or is greater than about 15. Generally the HUT/BT is less than about 100 for example less than 70, in some instances less than 40 and in further instances less than about 20. In some embodiments in mixing in Zone II of FIG. 1 the HUT/BT may be greater than about 4 and less than about 7. In other embodiments in mixing in Zone III of FIG. 1 the HUT/BT may be greater than about 7 less than about 50, or for example less than about 40. In some embodiments HUT/BT may be less than about 30 and in further embodiments less than about 20. In some embodiments where the HUT/BT is as described herein the catalyst activity is also greater than 20,000 m$^3$/kmol/s.

In one embodiment, the reactor circulation ratio is greater than about 7. In other embodiments, the reactor circulation ratio is greater than about 14, or, for example greater than about 25. In other embodiments, the reactor circulation ratio is less than about 2000. In some embodiments the reactor circulation ratio is less than 1000. In some embodiments the reactor circulation ratio is less than 500, or for example, less than 100. In some embodiments the reactor circulation ratio is less than 60. In some embodiments the reactor circulation ratio is less than 40. In some embodiments the reactor circulation ratio is less than 20. In some embodiments the reactor circulation ratio is less than 10. In some embodiments, the reactor circulation ratio is about 14 to about 60. In some embodiments the reactor circulation ratio may be from about 10 to about 40. In other embodiments, the reactor circulation ratio is from about 30 to about 40. In some embodiments where the circulation ratio is as described herein the catalyst activity is also greater than 20,000 m$^3$/kmol/s.

While most of the examples and disclosures herein discuss CSTR type reactors, this invention can be useful in other types of reactors. Also contemplated in the present disclosure are other agitated reactors capable of supporting a circulation ratio of greater than about 4. One example of such a reactor is a loop reactor.

In some embodiments, 1/the bulk Damkoehler number is between about 6 and about 150. In some embodiments, 1/the bulk Damkoehler number is between about 3 and about 6. In some embodiments, 1/bulk Damkoehler number (1/Dab) is greater than about 3. In some embodiments, 1/bulk Damkoehler number (1/Dab) is greater than 6. In some embodiments, 1/bulk Damkoehler number (1/Dab) is greater than about 3 and less than about 150. In some embodiments, 1/bulk Damkoehler number (1/Dab) is greater than 6 and less than 133. In further embodiments 1/bulk Damkoehler number (1/Dab) is less than 75. In further embodiments 1/bulk Damkoehler number (1/Dab) is less than 50. In some embodiments 1/bulk Damkoehler number (1/Dab) is less than 30. In further embodiments 1/bulk Damkoehler number (1/Dab) is less than 15. In some embodiments where the 1/bulk Damkoehler number (1/Dab) is as described herein the catalyst activity is also greater than 20,000 m$^3$/kmol/s.

In some embodiments 1/Bulk pumping Damkoehler number (1/Dap) is greater than about 5 and less than about 3,000. In some embodiments 1/Bulk pumping Damkoehler number (1/Dap) is less than about 2500. In some embodiments 1/Bulk pumping Damkoehler number (1/Dap) is less than about 2000. In some embodiments 1/Bulk pumping Damkoehler number (1/Dap) is less than about 1000. In some embodiments 1/Bulk pumping Damkoehler number (1/Dap) is less than about 500. In some embodiments 1/Bulk pumping Damkoehler number (1/Dap) is less than about 300. In some embodiments where the 1/Bulk pumping Damkoehler number (1/Dap) is as described herein the catalyst activity is also greater than 20,000 m$^3$/kmol/s.

In some embodiments the power to the agitator/unit volume is less than about 300 kW/m$^3$. In some embodiments the power to the agitator/unit volume is less than about 200 kW/m$^3$. In some embodiments the power to the agitator/unit volume is less than about 100 kW/m$^3$. In some embodiments the power to the agitator/unit volume is less than about 50 kW/m$^3$. In some embodiments the power to the agitator/unit volume is less than about 35 kW/m$^3$. In a further embodiment, the power to the agitator/unit volume is from about 5 to about 35 kW/m$^3$. In other embodiments, the power to the agitator/unit volume may be from about 20 to about 55 kW/m$^3$, or for example from about 30 to about 200 kW/m$^3$. In some embodiments where the power to the agitator/unit volume is as described herein the catalyst activity is also greater than 20,000 m$^3$/kmol/s.

In some embodiments the HUT/BT is greater than about 4 and less than about 20, (for example less than 10, and in some embodiments less than 7), the reactor circulation ratio is greater than about 7 and less than 500, (for example less than 300 in some embodiments less than 200); and the power/unit volume is less than about 100 kW/m$^3$ (for example less than about 50 kW/m$^3$ and in some embodiments less than 35 kW/m$^3$). In other embodiments 1/bulk Damkoehler number (1/Dab) is greater than about 3 and less than about 15, or in some embodiments less than 9, or in some embodiments less than 6. In some embodiments 1/pumping Damkoehler number (1/Dap) is greater than 5 and less than 3000. In some embodiments the foregoing compilation of parameters are present for example in Zone II of FIG. 1.

In some embodiments, the reactor circulation ratio is from about 7 to about 500 and reactor HUT/BT is from about 7 to about 20 and 1/bulk Damkoehler number is from about 6 to about 150 and the power per unit volume is less than 50 kW/m3.

In some embodiments, the reactor circulation ratio is from about 7 to about 500 and reactor HUT/BT is from about 7 to about 20 and 1/bulk Damkoehler number is from about 10 to about 120 and the power per unit volume is less than 50 kW/m3.

In some embodiments, the reactor circulation ratio is from about 7 to about 500 and reactor HUT/BT is from about 4 to about 7 and 1/bulk Damkoehler number is from about 10 to about 120 and the power per unit volume is less than 50 kW/m3.

In some embodiments, the reactor circulation ratio is from about 7 to about 500 and reactor HUT/BT is from about 4 to about 7 and 1/bulk Damkoehler number is from about 3 to about 50 and the power per unit volume is less than 50 kW/m3.

In some embodiments the HUT/BT is greater than about 7 and less than about 50, (or for example less than 25 and in some embodiments less than 20); and the reactor circulation ratio is greater than about 7 and less than 500, (or for example less than 100 or in some embodiments less than 50); and the power/unit volume is less than about 100 kW/m³ (for example less than about 50 kW/m³). In some embodiments 1/bulk Damkoehler number (1/Dab) is from about 6 to about 150, for example from about 6 to about 135, or in some embodiments from about 10 to about 120, or in some embodiments from about 20 to about 100. In some embodiments 1/pumping Damkoehler number (1/Dap) is greater than 5 and less than 3000. In some embodiments the foregoing compilation of parameters are typical of conditions in Zone III of FIG. 1.

The mixing performance of the reactor system depends of the activity of the polymerization catalyst. One method to compare the mixing performance of reactor systems for different catalyst systems is to include a ratio of apparent catalyst activity in the Damkoehler number calculation as shown in Equation (15) and (16). The activity ratio ($A_f$) for two catalyst systems is determined using the ratio of the apparent catalyst activity of the two catalyst systems.

As stated earlier, for a continuously stirred reactor, the apparent catalyst activity is defined as:

$$k_p^* = \frac{1}{[m]\theta}\left(\frac{Q_c}{1-Q_c}\right) \quad (17)$$

where $k_p^*$ is the apparent catalyst activity (kmole/m³s), [m] is the catalyst concentration (kmole/m³), $\theta$ is the reactor hold-up time (s) and $Q_c$ is the total monomer conversion or "combined" conversion.

The combined conversion ($Q_c$) is calculated from the ratio of polymerization rate divided by the total monomer flow rate:

$$Q_c = \frac{\dot{m}PE}{\dot{m}C_2 + \dot{m}C_x} \quad (18)$$

where $\dot{m}PE$ is the polymer production rate (kg/s), $\dot{m}C_2$ is the mass flow rate of ethylene feed to the reactor (kg/s) and $\dot{m}C_{x2}$ is the mass flow rate of comonomer feed to the reactor. Other mathematically equivalent expressions can be derived knowing ethylene feed flow rate, comonomer feed flow rate, ethylene conversion and comonomer content in the resin for those skilled in the art.

The apparent catalyst activity can also be calculated using other equivalent of Equation 17. Sometimes it is more practical to calculate $k_p^*$ from parameters that can be calculated more directly from the experimental data. For a leave-in catalyst system, the apparent catalyst activity can be determined by measuring the mass flow rate of the catalyst metal or by measuring the catalyst metal content in a polymer sample using the following equation:

$$k_p^* = \frac{\mathbb{V}}{\theta}\left(\frac{Q_c}{1-Q_c}\right)\frac{1}{\dot{m}PE}\frac{M_{wcat}}{M_{ppm}} \times 10^6 \quad (19)$$

where $\mathbb{V}$ is the total volumetric flow rate in the reactor (m³/s), $Q_c$ is the combined conversion (fractional conversion), $\theta$ is the reactor hold-up time (s), $\dot{m}PE$ is the polymer production rate (kg/s), $M_{w\ cat}$ is the molar mass of the catalyst metal (kg/kmole) and $M_{ppm}$ is the concentration of catalyst metal in the polymer (ppm by mass).

Equation (19) can also be written in terms of polymer concentration:

$$k_p^* = \frac{\mathbb{V}}{\theta \rho_{rx} w_{PE}}\left(\frac{Q_c}{1-Q_c}\right)\frac{M_{wcat}}{M_{ppm}} \times 10^6 \quad (20)$$

where $\rho_{rx}$ is the reactor fluid density (kg/m³), $w_{PE}$ is the weight fraction of polymer in the reactor.

Equations 17, 19 or 20 can be utilized to calculate the apparent catalyst activity and determine the scaling factor ($A_f$) for two catalyst systems for under defined conditions.

Catalysts having an apparent activity greater than about 20,000 m³/kmol/s may be used in accordance with the present invention. In some embodiments the catalyst may have an activity of greater than 50,000 m³/kmol/s, in some further embodiments the apparent activity may be greater than 250,000, in some further embodiments the apparent activity may be greater than 500,000 m³/kmol/s.

In some embodiments the reaction is a liquid polymerization process. In some embodiments the reaction is a slurry polymerization process. In some embodiments the reactor is an agitated reactor. In some embodiments the reactor is an agitated reactor selected from stirred tank, loop reactor static mixer, and static mixer in a loop. The solution polymerization process may be conducted in a stirred "reactor system" comprising one or more stirred tank reactors or in a mixed loop and stirred tank reactor system. The CSTR reactors may be cylindrical or spherical. The agitator may be selected from the group consisting of auger agitators, anchor agitators, radial blade turbine, pitched blade turbine, hydrofoil impeller, or a hybrid impeller comprising one or more of these elements. In some embodiments the reactor is a single reactor. In some embodiments the reactor is a dual reactor. In some embodiments the reactor is at least a dual reactor. The reactors may be in tandem or parallel operation. In some embodiments of a dual tandem reactor system, the first polymerization reactor preferably operates at lower temperature. The residence time in each reactor will depend on the design and the capacity of the reactor. Generally the reactors should be operated under conditions to achieve a thorough mixing of the reactants. In addition, in some embodiments from 20 to 60 wt % of the final polymer is polymerized in the first reactor, with the balance being polymerized in the second reactor. Solution phase reactors produce a single or substantially single phase product a polymer rich solution typically of one or more $C_4$ to $C_7$ alkanes.

The polymer model is a mathematical model based on polymerization reaction kinetics. The model uses defined inlet conditions, catalyst and reactor properties to determine outlet conditions, product properties, fluid properties and mixing performance.

Inlet flows, compositions and temperatures are measured experimentally or known from standard operating conditions and defined for the model. Detailed kinetic parameters have been determined specific to the catalyst system. Reactor and agitator geometries are defined in the model.

Reactor conversion, reactor temperature and outlet fluid composition are determined by reaction kinetics. Product properties (MWD, Melt Index (MI), number average molecular weight (Mn), density, branch frequency distribution) are determined based on the catalyst kinetics at the relevant fluid composition and temperature. Fluid properties, such as viscosity, are based on fluid composition, temperature, pressure and polymer properties. Mixing performance is then evaluated, and parameters such as HUT/BT, circulation ratio and the Damkoehler numbers may be determined.

Typically, one starts with a reactor design which may comprise one or more of the agitators noted above. The reactors will have several inlets or feed ports for solvent, monomer(s) (e.g. ethylene and one or more C4-8 comonomers), hydrogen, catalyst, etc. Based on standard operating conditions for a given product, one knows the overall total solution rate (TSR) for each reactor, the conversion of ethylene, the conversion of comonomer, the feed of hydrogen (in ppm), the inlet feed temperature for each stream, the mean temperature in the reactor, the ratio of comonomer to monomer, and in cases where there are two or more reactors, the split of each feed to each reactor. Additional factors one could include are the activity of the catalysts.

Using either commercially available software, such as ASPEN, or internally developed software, product properties such as molecular weights (one or more of Mn, weight average molecular weight (Mw), Z-average molecular weight (Mz)), polymer branch frequency, and polymer content (wt % in the reactor effluent) may be calculated based on known inlet flows, compositions and temperatures, as well as catalyst kinetics specific to the catalyst system. In the alternative, these product properties may be measured experimentally from product samples. If the product sample has a single, component, that may be used directly. In the case of multiple components in the product, the overall properties would need to be deconvoluted into constituent components with specific properties.

Once polymer properties are defined, one can develop a viscosity model for the fluid using either commercially available software, such as ASPEN, or internally developed software. This viscosity model would utilize the fluid composition, temperature, pressure and polymer properties. Fluid density and jet velocities may be modeled in the same manner.

Once the viscosity is determined one can model mixing performance indicators for the solution in the reactor, such as Damkoehler numbers (both bulk and pumping) at various locations in the reactor, and bulk Damkoehler numbers (both bulk and pumping), hold up time (HUT), blend time (BT or $\theta_{95}$), the circulation ratio. Additionally, one can measure the Power/Volume ratio (in $kW/m^3$ or other units) as required for further calculations.

Another embodiment of the invention provides a method for reducing the cost of operating a reactor, for example a CSTR. Another embodiment of the invention provides a method for increasing capacity in a reactor, for example a CSTR. These methods comprise the steps of a) measuring the HUT/BT and circulation ratio of the reactor, b) measuring the mixing performance indicator of the final polymer product, c) plotting the HUT/BT and/or circulation ratio vs the performance indicator, d) varying the agitator speed or HUT to get a new HUT/BT and circulation ratio, e) repeating steps a-d for a number times to generate a response curve, f) select the agitation rate of the reactor for commercial polyethylene polymerization so the mixing performance falls within Zone II or Zone III of FIG. 1.

In embodiments where the reactor is an agitated reactor other than CSTR, instead of varying the agitator speed other parameters may be changed to modify mixing performance. For example in a loop reactor, the number of static mixer elements or the circulation pump flow rate can be changed.

In some embodiments the slope of one or more mixing performance indicator (s) of the polymer product versus the HUT/BT and/or circulation ratio will change by less than 1 unit per unit of HUT/BT ratio and/or circulation ratio. In some embodiments the slope of one or more mixing performance indicator (s) of the polymer product versus the HUT/BT and/or circulation ratio will change by less than 0.75 unit per unit of HUT/BT ratio and/or circulation ratio. In some further embodiments the ratio will change by less than 0.5. In some further embodiments the ratio will change by less than 0.25. As a result the power consumption of the process can be reduced while still producing product within manufacturing specifications. In other embodiments, the same steps can be followed except that instead of plotting the HUT/BT Another embodiment of the invention provides a method for designing a reactor system to achieve a desired level of mixing performance. The method to achieve the desired mixing performance at a new scale comprises a) measuring the HUT/BT and circulation ratio and power number of a reactor system in laboratory scale to obtain curves as a function of Reynolds number, b) calculating the HUT/BT, circulation ratio and power at a new scale for various agitator speed to generate curves of HUT/BT, circulation ratio and power as a function of agitator speed given process conditions to manufacture product, c) repeating steps a and b for a different reactor and or agitator system, and d) then selecting the agitator and operating speed based on an acceptable power range to achieve the desired HUT/BT and circulation ratio.

The methods disclosed herein can increase throughput, especially in an adiabatic system, by reducing feed temperatures by increasing feed energy so that the bulk energy remains constant.

Another embodiment of the invention provides a method for transferring reaction conditions for an ethylene polymerization process from one plant to another comprising a) measuring the HUT/BT and circulation ratio of the reactor for the desired product, b) setting up the reaction conditions in the new reactor to match at least one of the HUT/BT and circulation ratio measured in step a. In one embodiment, the conditions in the new reactor match the HUT/BT measured in step a.

Another embodiment of the invention provides a method to improve the range of products that can be produced in a reactor system comprising: a) Determine desired product characteristics and process conditions by modeling, b) calculate or determine the HUT/BT and circulation ratio of the reactor system, c) iteratively varying the reactor process conditions to get a new HUT/BT and circulation ratio in the model, d) select the operating conditions that provide the desired determined product characteristics and acceptable mixing performance, then e) operate at the conditions selected in d.

Another embodiment of the invention provides a method to evaluate the relative mixing performance of multiple product and process conditions to determine the optimum conditions for producing a desired grade comprising: a) Determine desired product characteristics and process conditions by modeling, b) calculate the mixing parameters (HUT/BT, circulation ratio, bulk Damkoehler number, pumping Damkoehler number), c) iteratively adjust the reactor process conditions to get a new mixing parameters (HUT/BT, circulation ratio, bulk Damkoehler number, pumping Damkoehler number) in the model, d) select the operating conditions that provide the desired determined product characteristics and acceptable mixing performance, then e) operate at the conditions selected in d.

The foregoing process(es) may be used to select an agitation system to provide improved mixing performance in a CSTR reactor system.

Another embodiment of the invention provides a method to optimize the mixing performance of a reactor system for operating different catalyst systems or determining the suitability of a reactor system for a new catalyst system: a) experimentally determine the apparent catalyst activity for a first catalyst (catalyst 1) with a defined set of process conditions, b) experimentally determine the apparent catalyst activity for a second catalyst (catalyst 2) using similar process temperature and achieving similar product density (or comonomer content) as for the first catalyst (catalyst 1), c) determine the ratio of the apparent catalyst activities for catalyst 1 and catalyst 2 to determine the factor for catalyst 2 ($A_f$), d) calculate the mixing parameters (HUT/BT, circulation ratio, bulk Damkoehler number, pumping Damkoehler number) for both catalyst system using the appropriate scaling factor for catalyst 2 ($A_f$), e) iteratively adjusting the reactor process conditions to get a new set of mixing parameters (HUT/BT, circulation ratio, bulk Damkoehler number, pumping Damkoehler number), d) select the operating conditions that provide the desired determined product characteristics and acceptable mixing performance for the new catalyst system, then run the process.

The foregoing process(es) may be used to provide a good initial estimate for operating conditions and some further optimization may be required in some embodiments.

In the solution polymerization of alpha olefins a number of catalysts may be used alone or in combination. The catalysts may be selected from the group consisting of single site catalysts, Ziegler-Natta catalysts, and chrome catalyst. In solution polymerization process the catalysts are not supported. They may be formed in situ in line(s) leading to the reactor (i.e. on line) or could be pre-formed off line. The off line catalyst need to be soluble or dispersible in the solvent for the reaction or a solvent which will not interfere with the reaction.

Ziegler Natta Catalysts

Ziegler-Natta catalysts having an activity greater than 20,000 m³/kmol/s may comprise a magnesium compound (optionally in the presence of a halide donor to precipitate magnesium halide), a titanium compound and an aluminum compound, in the presence of an electron donor. The aluminum compound may be added at several stages.

Ziegler-Natta catalysts may comprise an aluminum compound of the formula $R^1_b Al(OR^1)_a X_{3-(a+b)}$ wherein a is an integer from 0 to 3, b is an integer from 0 to 3 and the sum of a+b is from 0 to 3, $R^1$ is the same or different $C_{1-10}$ alkyl radical and X is a chlorine atom, a transition metal, for example a titanium compound of the formula $Ti((O)_c R^2)_d X_e$ wherein $R^2$ is selected from $C_{1-4}$ alkyl radicals, $C_{6-10}$ aromatic radicals and mixtures thereof, X is selected from a chlorine atom and a bromine atom, c is 0 or 1, d is 0 or an integer from 1 to 4 and e is 0 or an integer from 1 to 4 and the sum of d+e is the valence of the Ti atom; a magnesium compound of the formula $(R^5)_f MgX_{2-f}$ wherein each $R^5$ is independently a $C_{1-8}$ alkyl radical and f is 0, 1 or 2; $CCl_4$ or an alkyl halide selected from $C_{3-6}$ secondary or tertiary alkyl halides and optionally an electron donor, a molar ratio of total Al to Ti (e.g. the first and/or second aluminum additions (if two additions are made) $Al^1$ and $Al^2$ from 2:1 to 15:1 a molar ratio of Al from the second aluminum ($Al^2$) addition to Ti from 1:1 to 8:1; a molar ratio of Mg:Ti from 0.5:1 to 20:1, or for example 1:1 to 12:1; a molar ratio of active halide (this excludes the halide from the Al and Ti compounds) from the $CCl_4$ or alkyl halide to Mg from 1:1 to 6:1, or for example 1.5:1 to 5:1; and a molar ratio of electron donor to Ti from 0:1 to 18:1, or for example from 1:1 to 15:1.

Typically the catalyst components are reacted in an organic medium such as an inert $C_{5-10}$ hydrocarbon which may be unsubstituted or is substituted by a $C_{1-4}$ alkyl radical.

Some solvents include pentane, iso-pentane, hexane, isohexane, heptane, octane, cyclohexane, methyl cyclohexane, hydrogenated naphtha and ISOPAR®E (a solvent available from Exxon Chemical Company) and mixtures thereof.

The aluminum compounds useful in the formation of the catalyst or catalyst precursor have the formula $R^1_b Al(OR^1)_a X_{3-(a+b)}$ wherein a is an integer from 0 to 3, b is an integer from 0 to 3 and the sum of a+b is from 0 to 3, $R^1$ is the same or different $C_{1-10}$ alkyl radical and X is a chlorine atom. Suitable aluminum compounds include trimethyl aluminum (TMA), triethyl aluminum (TEAL), isoprenyl aluminum, tri-isobutyl aluminum (TiBAL), diethyl aluminum chloride (DEAC), tri-n-hexyl aluminum (TnHAl), tri-n-octyl aluminum (TnOAl), diethyl aluminum ethoxide and mixtures thereof. The aluminum compounds containing a halide may be an aluminum sesqui-halide. In one example, in the aluminum compound a is 0, b is 3 and $R^1$ is a $C_{1-8}$ alkyl radical.

The magnesium compound may be a compound of the formula $(R^5)_f MgX_{2-f}$ wherein each $R^5$ is independently selected from $C_{1-8}$ alkyl radicals and f is 0, 1 or 2. Some commercially available magnesium compounds include magnesium chloride, butyl octyl magnesium, dibutyl magnesium and butyl ethyl magnesium. If the magnesium compound is soluble in the organic solvent it may be used in conjunction with a halogenating agent or reactive organic halide to form magnesium halide (i.e. $MgX_2$ where X is a halogen for example, chlorine or bromine, or for example chlorine), which precipitates from the solution (potentially forming a substrate for the Ti compound). Some halogenating agents include $CCl_4$ or a secondary or tertiary halide of the formula $R^6Cl$ wherein $R^6$ is selected from secondary and tertiary $C_{3-6}$ alkyl radicals. Suitable chlorides include sec-butyl chloride, t-butyl chloride and sec-propyl chloride. The reactive halide is added to the catalyst in a quantity such that the active Cl:Mg molar ratio should be from 1.5:1 to 5:1, or for example, from 1.75:1 to 4:1, or for example, from 1.9:1 to 3.5:1.

The titanium compound in the catalyst may have the formula $Ti((O)_cR^2)_dX_e$ wherein $R^2$ is selected from $C_{1-4}$ alkyl radicals, $C_{6-10}$ aromatic radicals and mixtures thereof, X is selected from a chlorine atom and a bromine atom, c is 0 or 1, d is 0 or an integer up to 4 and e is 0 or an integer up to 4 and the sum of d+e is the valence of the Ti atom. If c is 1 the formula becomes $Ti(OR^2)_dX_e$ wherein $R^2$ is selected from $C_{1-4}$ alkyl radicals, and $C_{6-10}$ aromatic radicals, X is selected from a chlorine atom and a bromine atom, or is, for example a chlorine atom, d is 0 or an integer up to 4 and e is 0 or an integer up to 4 and the sum of d+e is the valence of the Ti atom. The titanium compound may be selected from $TiCl_3$, $TiCl_4$, $Ti(OC_4H_9)_4$, $Ti(OC_3H_7)_4$, and $Ti(OC_4H_9)Cl_3$ and mixtures thereof. In one embodiment, the titanium compound is selected from $Ti(OC_4H_9)_4$ and $TiCl_4$ and mixtures thereof.

As noted above, an electron donor may be used in the catalysts or catalysts precursor. The electron donor may be selected from $C_{3-18}$ linear or cyclic aliphatic or aromatic ethers, ketones, esters, aldehydes, amides, nitriles, amines, phosphines or siloxanes. In one embodiment, the electron donor is selected from diethyl ether, triethyl amine, 1,4-dioxane, tetrahydrofuran, acetone, ethyl acetate, and cyclohexanone and mixtures thereof. The electron donor may be used in a molar ratio to the titanium from 0:1 to 18:1 or, for example, in a molar ratio to Ti from 3:1 to 15:1, or, for example, from 3:1 to 12:1.

In the catalyst or catalyst precursor the molar ratio of Mg:Ti may be from 0.5:1 to 20:1, or, for example, from 1:1 to 12:1, or, for example, from 1:1 to 10:1. If a second aluminum addition is used the molar ratio of second aluminum ($Al^2$) to titanium in the catalyst may be from 1:1 to 8:1, or, for example, from 1.5:1 to 7:1, or, for example, from 2:1 to 6:1. Generally, from 0 to not more than about 60 weight %, or, for example, from 10 to 50 weight %, of the aluminum (compound in the catalyst) may be used to treat the support (e.g. $Al^1$). The molar ratio of active halide (from the alkyl halide or $CCl_4$) to Mg may be from 1.5:1 to 5:1 or, for example, from 1.75:1 to 4:1, or, for example, from 1.9:1 to 3.5:1. The molar ratio of electron donor, if present, to Ti may be from 1:1 to 15:1, or, for example, from 3:1 to 12:1.

The Ziegler-Natta catalyst may be activated with one or more co-catalysts of the formula $Al(R^7)_{3-g}X_g$ wherein $R^7$ is a $C_{1-6}$ alkyl radical, X is a chlorine atom and g is 0 or 1 and mixtures thereof. The co-catalyst may be selected from tri $C_{1-6}$ alkyl aluminums, alkyl aluminum chlorides (e.g. di $C_{1-6}$ alkyl aluminum chloride), and mixtures thereof. This includes, but is not limited to, trimethyl aluminum, triethyl aluminum, tri propyl aluminum, tributyl aluminum, tri isobutyl aluminum, isoprenylaluminum, n-hexyl aluminum, diethyl aluminum chloride, dibutyl aluminum chloride, and mixtures thereof. In one embodiment the co-catalyst is triethyl aluminum.

The co-catalyst may be fed to the reactor to provide from about 10 to about 130, or, for example, about 10 to about 80 or, for example, from about 15 to about 70, or, for example, from about 20 to about 60 ppm of aluminum (Al ppm) based on the polymer production rate.

Single Site Catalysts

In some embodiments, the catalyst is a single site catalyst. Some embodiments of the present invention may use a catalyst which is a bulky ligand single site catalyst. The bulky ligand single site catalysts may have the formula:

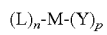

wherein M is selected from Ti, Zr and Hf; L is a monoanionic ligand independently selected from cyclopentadienyl-type ligands, and a bulky heteroatom ligand containing not less than five atoms in total (of which at least 20%, or, for example, at least 25% numerically are carbon atoms) and further containing at least one heteroatom selected from boron, nitrogen, oxygen, phosphorus, sulfur and silicon, said bulky heteroatom ligand being sigma or pi-bonded to M, Y is independently selected from activatable ligands; n is from 1 to 3; and p is from 1 to 3, provided that the sum of n+p equals the valence state of M, and further provided that two L ligands may be bridged for example by a silyl radical or a $C_{1-4}$ alkyl radical, or a mixture thereof.

The term "cyclopentadienyl" refers to a 5-member carbon ring having delocalized bonding within the ring and typically being bound to the active catalyst site, generally a group 4 metal (M) through $\eta^5$-bonds. The cyclopentadienyl ligand may be unsubstituted or up to fully substituted with one or more substituents independently selected from $C_{1-10}$ hydrocarbyl radicals which hydrocarbyl substituents are unsubstituted or further substituted by one or more substituents independently selected from a halogen atom and a $C_{1-4}$ alkyl radical; a halogen atom; a $C_{1-8}$ alkoxy radical; a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—$(R)_3$ wherein each R is independently selected from hydrogen, a $C_{1-8}$ alkyl or alkoxy radical, and $C_{6-10}$ aryl or aryloxy radicals; and germanyl radicals of the formula Ge—$(R)_3$ wherein R is as defined above.

Typically the cyclopentadienyl-type ligand is selected from a cyclopentadienyl radical, an indenyl radical and a fluorenyl radical which radicals are unsubstituted or up to fully substituted by one or more substituents independently selected from a fluorine atom, a chlorine atom; $C_{1-4}$ alkyl radicals; and a phenyl or benzyl radical which is unsubstituted or substituted by one or more fluorine atoms.

In the formula above if none of the L ligands is a bulky heteroatom ligand then the catalyst could be a mono cyclopentadienyl (Cp) catalyst, a bridged or unbridged bis Cp catalyst or a bridged constrained geometry type catalysts or a tris Cp catalyst.

If the catalyst contains one or more bulky heteroatom ligands the catalyst would have the formula:

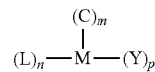

wherein M is a transition metal selected from Ti, Hf and Zr; C is a bulky heteroatom ligand preferably independently selected from phosphinimine ligands (as described below) and ketimide ligands (as described below); L is a monoanionic ligand independently selected from cyclopentadienyl-type ligands; Y is independently selected from activatable ligands; m is 1 or 2; n is 0 or 1; and p is an integer and the sum of m+n+p equals the valence state of M, provided that when m is 2, C may be the same or different bulky heteroatom ligands.

For example, the catalyst may be a bis (phosphinimine), a bis (ketimide), or a mixed phosphinimine ketimide dichloride complex of titanium, zirconium or hafnium. Alternatively, the catalyst could contain one phosphinimine ligand or one ketimide ligand, one "L" ligand (which is in one embodiment a cyclopentadienyl-type ligand) and two "Y" ligands (which may both be chloride).

The metals (M) may be from Group 4 (for example titanium, hafnium or zirconium). In one embodiment the catalysts are group 4 metal complexes in the highest oxidation state.

The catalyst may contain one or two phosphinimine ligands (PI) which are bonded to the metal. The phosphinimine ligand is defined by the formula:

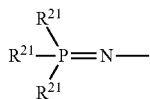

wherein each $R^{21}$ is independently selected from a hydrogen atom; a halogen atom; $C_{1-20}$, or, for example, $C_{1-10}$ hydrocarbyl radicals which are unsubstituted by or further substituted by a halogen atom; a $C_{1-8}$ alkoxy radical; a $C_{6-10}$ aryl or aryloxy radical; an amido radical; a silyl radical of the formula:

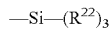

wherein each $R^{22}$ is independently selected from hydrogen, a $C_{1-8}$ alkyl or alkoxy radical, and $C_{6-10}$ aryl or aryloxy radicals; and a germanyl radical of the formula:

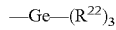

wherein $R^{22}$ is as defined above.

Example phosphinimines are those in which each $R^{21}$ is a hydrocarbyl radical, or, for example, a $C_{1-6}$ hydrocarbyl radical, such as a t-butyl radical.

Suitable phosphinimine catalysts are, for example, Group 4 organometallic complexes which contain one phosphinimine ligand (as described above) and one ligand L which is either a cyclopentadienyl-type ligand or a heteroatom ligand.

As used herein, the term "ketimide ligand" refers to a ligand which a) is bonded to the transition metal via a metal-nitrogen atom bond;

b) has a single substituent on the nitrogen atom (where this single substituent is a carbon atom which is doubly bonded to the N atom); and c) has two substituents Sub 1 and Sub 2 (described below) which are bonded to the carbon atom.

Conditions a, b and c are illustrated below:

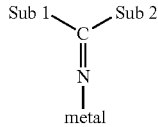

The substituents "Sub 1" and "Sub 2" may be the same or different. Exemplary substituents include hydrocarbyls having from 1 to 20, or, for example, from 3 to 6, carbon atoms, silyl groups (as described below), amido groups (as described below) and phosphido groups (as described below). In one embodiment these substituents are hydrocarbyls, for example, simple alkyls radicals and or, for example, tertiary butyl radicals.

Suitable ketimide catalysts are, for example, Group 4 organometallic complexes which contain one ketimide ligand (as described above) and one ligand L which is either a cyclopentadienyl-type ligand or a heteroatom ligand.

The term bulky heteroatom ligand is not limited to phosphinimine or ketimide ligands and includes ligands which contain at least one heteroatom selected from boron, nitrogen, oxygen, phosphorus, sulfur or silicon. The heteroatom ligand may be sigma or pi-bonded to the metal. Exemplary heteroatom ligands include silicon-containing heteroatom ligands, amido ligands, alkoxy ligands, boron heterocyclic ligands and phosphole ligands, as all described below.

Silicon containing heteroatom ligands are defined by the formula:

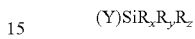

wherein the — denotes a bond to the transition metal and Y is sulfur or oxygen.

The substituents on the Si atom, namely $R_x$, $R_y$ and $R_z$ are required in order to satisfy the bonding orbital of the Si atom. The use of any particular substituent $R_x$, $R_y$ or $R_z$ is not especially important to the success of this invention. In one embodiment, each of $R_x$, $R_y$ and $R_z$ is a $C_{1-2}$ hydrocarbyl group (i.e. methyl or ethyl).

The term "amido" is meant to convey its broad, conventional meaning. Thus, these ligands are characterized by (a) a metal-nitrogen bond; and (b) the presence of two substituents (which are in some embodiments simple alkyl or silyl groups) on the nitrogen atom.

The terms "alkoxy" and "aryloxy" is intended to convey its conventional meaning. Thus, these ligands are characterized by (a) a metal oxygen bond; and (b) the presence of a hydrocarbyl group bonded to the oxygen atom. The hydrocarbyl group may be a $C_{1-10}$ straight chained, branched or cyclic alkyl radical or a $C_{6-13}$ aromatic radical which radicals are unsubstituted or further substituted by one or more $C_{1-4}$ alkyl radicals (e.g. 2,6 di-tertiary butyl phenoxy).

Boron heterocyclic ligands are characterized by the presence of a boron atom in a closed ring ligand. This definition includes heterocyclic ligands which may also contain a nitrogen atom in the ring. These ligands are well known to those skilled in the art of olefin polymerization and are fully described in the literature.

The term "phosphole" is also meant to convey its conventional meaning. "Phospholes" are cyclic dienyl structures having four carbon atoms and one phosphorus atom in the closed ring. The simplest phosphole is $C_4PH_4$ (which is analogous to cyclopentadiene with one carbon in the ring being replaced by phosphorus). The phosphole ligands may be substituted with, for example, $C_{1-20}$ hydrocarbyl radicals (which may, optionally, contain halogen substituents); phosphido radicals; amido radicals; or silyl or alkoxy radicals. Phosphole ligands are also well known to those skilled in the art of olefin polymerization.

The term "activatable ligand" (i.e. "Y" in the above formula) or "leaving ligand" refers to a ligand which may be activated by the aluminoxane (also referred to as an "activator") to facilitate olefin polymerization. Exemplary activatable ligands are independently selected from a hydrogen atom; a halogen atom, or, for example, a chlorine or, for example, fluorine atom; a $C_{1-10}$ hydrocarbyl radical, for example, a $C_{1-4}$ alkyl radical; a $C_{1-10}$ alkoxy radical, for example, a $C_{1-4}$ alkoxy radical; and a $C_{5-10}$ aryl oxide radical; each of which said hydrocarbyl, alkoxy, and aryl oxide radicals may be unsubstituted by or further substituted by one or more substituents selected from a halogen atom, or, for example, a chlorine or fluorine atom; a $C_{1-8}$ alkyl radical, for example, a $C_{1-4}$ alkyl radical; a $C_{1-8}$ alkoxy radical, for example, a $C_{1-4}$ alkoxy radical; a $C_{6-10}$ aryl or aryloxy radical; an amido radical which is unsubstituted or substituted by up to two $C_{1-8}$, for example, $C_{1-4}$ alkyl radicals; and a phosphido radical which is unsubstituted or substituted by up to two $C_{1-8}$, for example, $C_{1-4}$ alkyl radicals.

The number of activatable ligands (Y) depends upon the valency of the metal and the valency of the activatable ligand. Example catalyst metals are Group 4 metals in their highest oxidation state (i.e. 4$^+$) and examples activatable ligands are monoanionic (such as a halide—for example, chloride or $C_{1-4}$ alkyl radicals, or methyl radicals).

In one embodiment, the transition metal complex may have the formula: $[(Cp)_nM[N=P(R^{21})]_mY_p$ wherein M is the transition (group 4) metal; Cp is a $C_{5-13}$ ligand containing a 5-membered carbon ring having delocalized bonding within the ring and bound to the metal atom through covalent $\eta^5$ bonds and said ligand being unsubstituted or up to fully 4 substituted with one or more substituents selected from a halogen atom, for example, chlorine or fluorine; $C_{1-4}$ alkyl radicals; and benzyl and phenyl radicals which are unsubstituted or substituted by one or more halogen atoms, for example, fluorine; $R^{21}$ is a substituent selected from $C_{1-6}$ straight chained or branched alkyl radicals, $C_{6-10}$ aryl and aryloxy radicals which are unsubstituted or may be substituted by up to three $C_{1-4}$ alkyl radicals, and silyl radicals of the formula —Si—(R)$_3$ wherein R is $C_{1-4}$ alkyl radical or a phenyl radical; Y is a leaving ligand; n is 1 or 2; m is 1 or 2; and the valence of the transition metal-(n+m)=p.

For the single site type catalyst the activator may be a complex aluminum compound of the formula $R^{12}{}_2AlO(R^{12}AlO)_qAlR^{12}{}_2$ wherein each $R^{12}$ is independently selected from $C_{1-20}$ hydrocarbyl radicals and q is from 3 to 50.

In the aluminum compound in one embodiment, $R^{12}$ is a methyl radical and q is from 10 to 40.

The catalysts systems in accordance with the present invention may have a molar ratio of aluminum from the aluminoxane to transition metal from 5:1 to 1000:1, or, for example, from 10:1 to 500:1, or, for example, from 30:1 to 300:1, or, for example, 50:1 to 120:1.

The phrase "and mixtures thereof" in relation to the catalyst mean the catalyst may be a mixture of one or more Ziegler-Natta catalysts, a mixture of one or more bulky ligand single site catalysts, and a mixture of one or more Ziegler-Natta catalysts with one or more bulky ligand single site catalysts.

Generally the polymerizations of olefins may take place in a solution in which the solvent is selected from one or more $C_{5-12}$ saturated hydrocarbons. Typically a $C_{3-8}$ hydrocarbon, which may be unsubstituted or substituted by a $C_{1-4}$ alkyl group, such as pentane, methyl pentane, hexane, heptane, octane, cyclohexane, methylcyclohexane and hydrogenated naphtha. An example of a suitable solvent that is commercially available is "Isopar E" ($C_{8-12}$ aliphatic solvent, Exxon Chemical Co.).

In some embodiments the reactor temperature is greater than about 180° C. In some embodiments solution polymerization processes are conducted at temperatures from 110° C. to 300° C., or in some embodiments from 120° C. to 250° C., or in some embodiments from 120° C. to 180° C., or in some embodiments from 160° C. to 230° C. In some embodiments the reactor pressures are from 5 to 40 MPa, or in some embodiments from 3 to 22 MPa, or in additional embodiments from 5 to 20 MPa.

The pressure in the reactor system should be high enough to maintain the polymerization solution as a single phase solution and to provide the necessary upstream pressure to feed the polymer solution from the reactor system through a heat exchanger system and to a devolatilization system.

The monomers may comprise one or more $C_{2-8}$ alpha olefins such as ethylene, propylene, 1-butene, 1-hexene, and 1-octene. In some embodiments, the α-olefin is present and is selected from propene, butene, hexene, and octene.

The present invention will further be described by reference to the following examples. The following examples are merely illustrative of the invention and are not intended to be limiting. Unless otherwise indicated, all percentages are by weight unless otherwise specified.

EXAMPLES

Example 1—Determination of Minimum Mixing Conditions to Achieve Stable Operation and Acceptable Product In a particular embodiment, the polymerization was conducted in a continuously stirred tank with a draft tube agitator system, substantially described in U.S. Pat. No. 6,024,483 issued Feb. 15, 2000 and U.S. Pat. No. 6,319,996 issued Nov. 20, 2001 to Burke et al., assigned to NOVA Chemicals (International) S.A. In this example, the process conditions were held constant except for the agitator speed. The process conditions and product characteristics are summarized Table 1 and Table 2. Cyclopentadienyltitanium(tri-tert-butylphosphinimine) dichloride (CpTi(N=PtBu3)Cl2) single site catalyst was used in this example, and isohexane was used as the solvent.

TABLE 1

| Process Conditions For Example 1 | |
|---|---|
| Process Temperature ° C. | 162 |
| Process Pressure kPa | 15 000 |
| Ethylene Concentration wt % | 11.5 |
| Ethylene Conversion % | 91 |
| Total monomer Conversion % | 57 |
| Ethylene Flow kg/hr | 50.7 |
| Octene Flow kg/hr | 34 |
| Octene Purity % | 93.9 |
| Reactor Residence time s | 53 |
| Solvent Flow (kg/hr) | 356.2 |
| Feed Temperature ° C. | 30 |
| Catalyst Concentration ppm by Mass | 0.42 |
| Melt Index | |
| I2 Melt Index | 1.51 |
| Density | 0.917 |

TABLE 2

Mixing Parameters for Example 1

| Agitator speed (rpm) | Power/Volume (kW/m3) | HUT/BT | Circulation Ratio | 1/Da$_{bulk}$ | 1/Da$_{pump}$ | ISTAF91 (%) | ISTAF91/ISTAF91* |
|---|---|---|---|---|---|---|---|
| 936* | 36.3 | 13.6 | 30.4 | 10.3 | 22.9 | 3.2 | 1 |
| 690 | 18.3 | 9.9 | 20.3 | 7.5 | 15.3 | 4.5 | 1.4 |
| 550 | 10.6 | 7.8 | 15.4 | 5.9 | 11.6 | 6.3 | 2.0 |
| 450 | 7.7 | 6.1 | 11.6 | 4.6 | 8.8 | 12.5 | 3.9 |

*base case for ISTAF91 is 936 rpm

For this example, operating the reactor at speeds equal or higher than 550 rpm resulted in a product with acceptable uniformity and stable operating conditions. The SSA-STAF trace showed a higher temperature peak area (ISTAF91) of less than 8%. At 450 rpm, the reactor was unstable. The mixing conditions resulted in unstable temperature profile, and the SSA-STAFT trace for the product showed a significant increase in the higher temperature peak. Conditions which exceeded a hold-up time to blend time ratio (HUT/BT) greater than 7 and a circulation ratio greater than 15 lead to product with acceptable product property and the reactor was operating in a region which is more stable.

Example 2: Using Damkeoler Numbers to Compare Mixing Performance of Product Made Under Different Process Conditions In this example only reactor 1 (R1) was used. The same catalyst and solvents are used as in Example 1.

TABLE 3

Process Conditions For Example 2

| | | 2A | 2B |
|---|---|---|---|
| Process Temperature | ° C. | 162 | 162 |
| Process Pressure | kPa | 15 000 | 15 000 |
| Ethylene Concentration | wt % | 12.4 | 11.5 |
| Ethylene Conversion | % | 85 | 91 |
| Total Monomer Conversion | % | 52 | 57 |
| Ethylene Flow | kg/hr | 54.6 | 50.7 |
| Octene Flow | kg/hr | 36.7 | 34 |
| Octene Purity | % | 93.9 | 93.9 |
| Reactor Residence Time | s | 53 | 53 |
| Solvent Flow | (kg/hr) | 349.5 | 356.2 |
| Feed Temperature | ° C. | 20 | 20 |
| Catalyst Concentration | ppm by mass | 0.18 | 0.42 |
| Melt Index | I$_2$ melt index | 1.60 | 1.51 |
| Density | g/cm$^3$ | 0.9205 | 0.917 |

Figure 5:
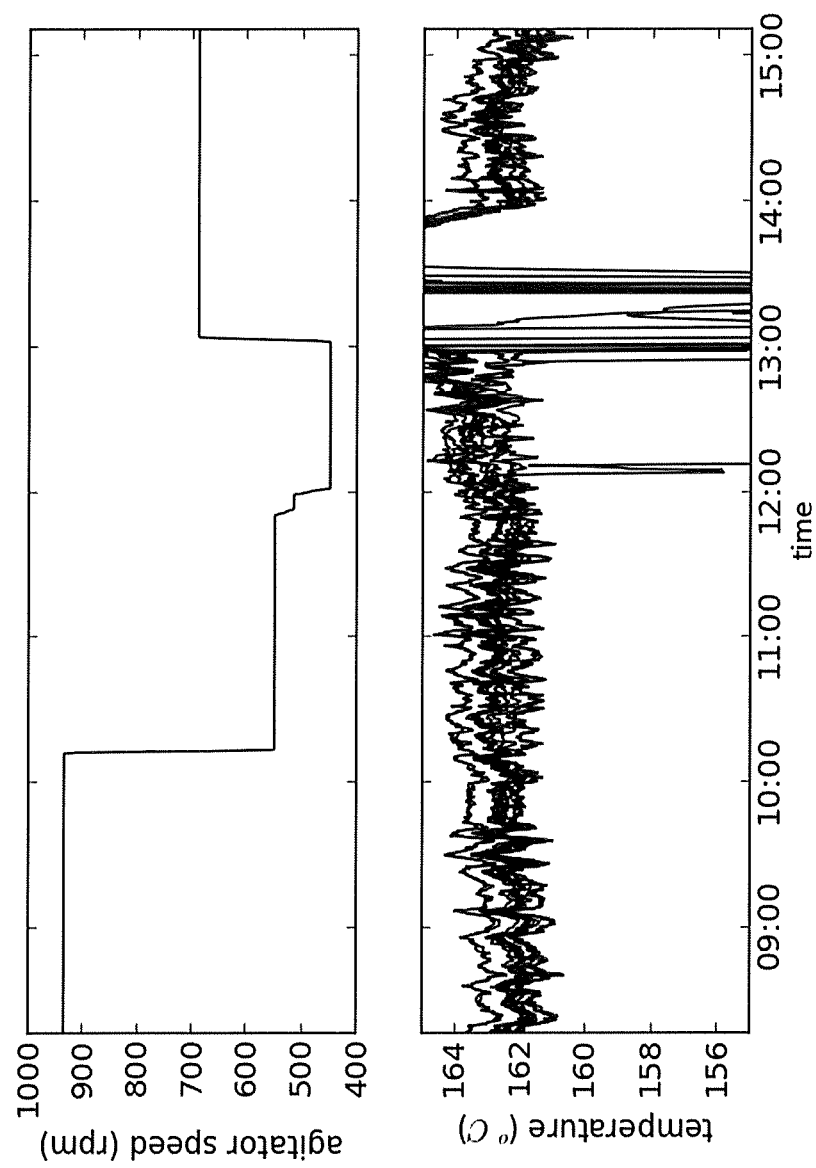
FIG. 5: Process trend plot of agitator speed and reactor temperatures for operating conditions of Example 2B

As per example 1, the polymerization was conducted in a continuously stirred tank with a draft tube agitator system. In this example, the reactor is operated at different ethylene conversion. The agitator is operated at same speeds but the mixing performance is quite different due to changes is the reaction kinetics. This example illustrates the benefits of using bulk and pumping Damkoehler numbers to compare the mixing performance of products made with different process conditions with the same catalyst system. The process conditions and product characteristics are summarized Table 3 and 4. Example 2A was run with an ethylene conversion of 85% and Example 2B was run with an ethylene conversion of 91%, resulting in total comonomer conversion of 52% and 57%. The purpose of using the Damkoehler numbers is to enable the comparison of the mixing performance for preparing two products. The inverse of the bulk Damkoehler numbers for Example 2B are much lower than for Example 2A due to operation at higher conversion. The impact of mixing performance on the product quality is indicated by the ratio of the ISTAF91 value at a given agitator speed divided by the ISTAF91 value for the highest agitator speed. In Example 2A the ISTAF91 ratio values ranges from 1 to 1.6. In Example 2B, the ISTAF91 ratio ranges from 1 to 3.9, indicating a reactor conditions which are much more sensitive to mixing. Operating the reactor at 450 rpm in Example 2B resulted in an unstable temperature profile across the reactor (See FIG. 5).

Example 3: Comparing Agitator Performance and Power Optimization

Figure 6:
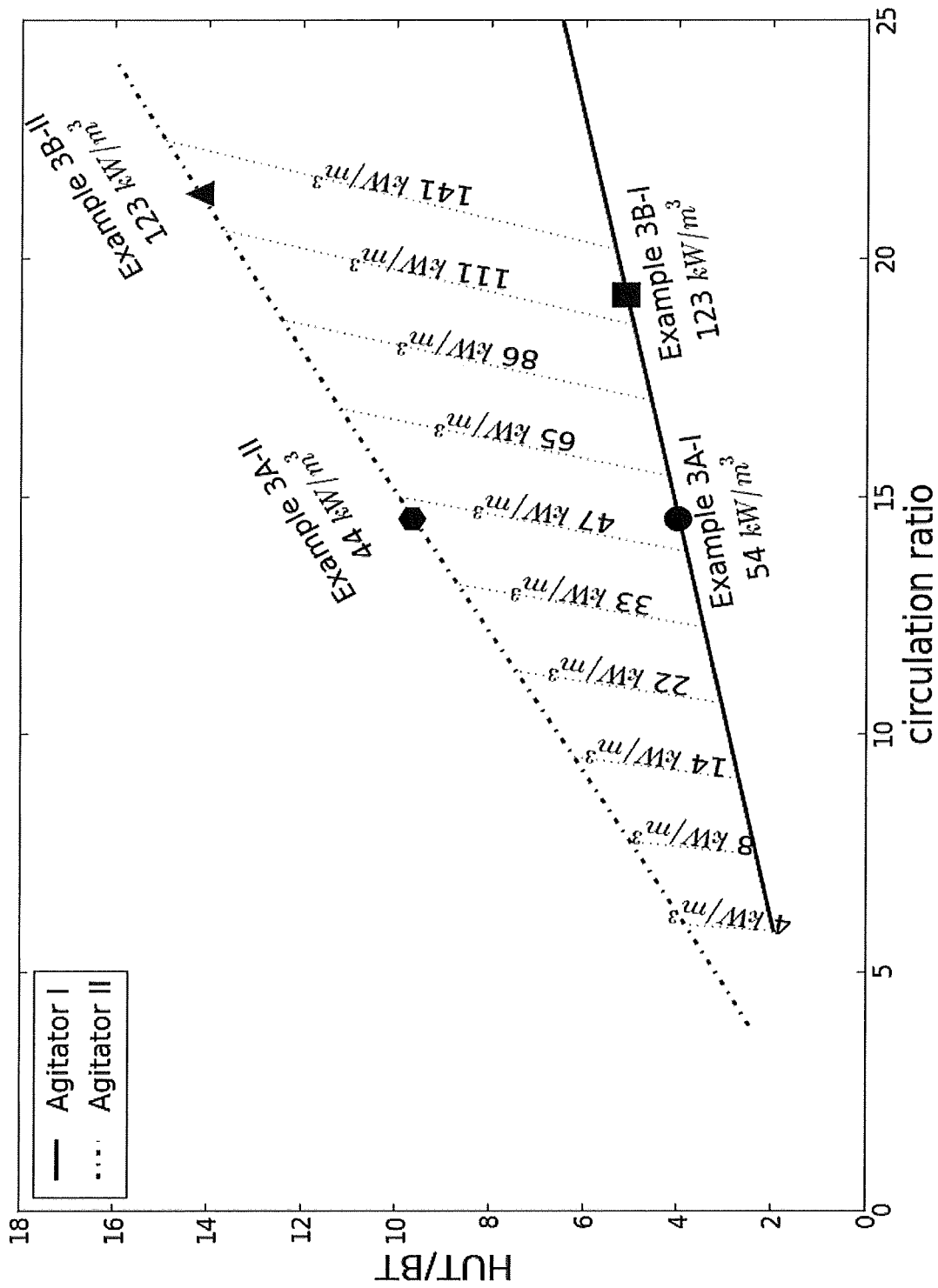
FIG. 6: Plot of reactor hold up time (HUT)/Blend time (BT) against the circulation ratio, with tie lines indicating the power/volume for two agitator types in a reactor.

FIG. 6 shows how to utilize the mixing parameters to compare agitator performance and optimize power usage. The tie line indicates same power usage for the two agitator systems. Example 4A compares the power consumption when matching the circulation ratio of agitator system I and II. For the same circulation ratio, agitator uses less power and achieves a higher HUT/BT ratio. Example 4B compares

TABLE 4

| Example | Agitator speed (rpm) | Power/Volume (kW/m3) | HUT/BT | Circulation Ratio | 1/Da$_{bulk}$ | 1/Da$_{pump}$ | ISTAF91/ISTAF91* |
|---|---|---|---|---|---|---|---|
| 2A | 936[1] | 37.0 | 13.5 | 30.0 | 12.5 | 27.7 | 1.0 |
| | 690 | 16.6 | 9.9 | 20.9 | 9.1 | 19.3 | 1.4 |
| | 550 | 9.2 | 7.9 | 16.2 | 7.2 | 15.0 | 1.1 |
| | 450 | 5.9 | 6.3 | 12.5 | 5.8 | 11.5 | 1.6 |
| 2B | 936[2] | 36.3 | 13.6 | 30.4 | 10.3 | 22.9 | 1 |
| | 690 | 18.3 | 9.9 | 20.3 | 7.5 | 15.3 | 1.4 |
| | 550 | 10.6 | 7.8 | 15.4 | 5.9 | 11.6 | 2.0 |
| | 450 | 7.7 | 6.1 | 11.6 | 4.6 | 8.8 | 3.9 |

*[1]Example 2A base case for ISTAF91 is 936 rpm
*[2]Example 2B base case for ISTAF91 is 936 rpm the mixing performance of agitator I and II when using the same power/unit volume. In this case, agitator II provides improved mixing performance for the same power.

The present invention has been described with reference to certain details of particular embodiments thereof. It is not intended that such details be regarded as limitations upon the scope of the invention except insofar as and to the extent that they are included in the accompanying claims.

INDUSTRIAL APPLICABILITY

The various embodiments of the disclosed invention are useful for industrial scale polymerization processes, for example processes used to make polyethylene polymers and copolymers.

The invention claimed is:

1. A method for fluid phase polymerizing a polyethylene polymer or copolymer comprising reacting a polymerization catalyst having an apparent activity between 20,000 $m^3$/kmole/sec and 500,000 $m^3$/kmole/sec with ethylene, optionally a $C_{3-12}$ α-olefin, and hydrogen in an agitated reactor wherein the reactor HUT/BT is greater than 7 and the reactor circulation ratio is between about 7 and about 2000.

2. The method of claim 1, wherein the reactor HUT/BT is from about 7 to about 100.

3. The method of claim 1, wherein the reactor circulation ratio is from about 7 to about 1000.

4. The method of claim 1, wherein 1/the bulk Damkoehler number is between about 6 and about 150.

5. The method of claim 1, wherein the reactor circulation ratio is from about 7 to about 500 and reactor HUT/BT is from about 7 to about 20 and 1/bulk Damkoehler number is from about 6 to about 150.

6. The method of claim 1, wherein the power (to operate the agitator)/unit volume (of the reactor) is less than 300 kW/m3.

7. The method of claim 1, wherein the catalyst is a single site catalyst.

8. The method of claim 1, wherein the catalyst comprises a single site catalyst of the formula:

$(L)_n$-M-$(Y)_p$ wherein M is selected from Ti, Zr and Hf; L is a monoanionic ligand independently selected from cyclopentadienyl-type ligands, and a heteroatom ligand containing not less than five atoms in total and further containing at least one heteroatom selected from boron, nitrogen, oxygen, phosphorus, sulfur and silicon, said heteroatom ligand being sigma or pi-bonded to M, Y is independently selected from activatable ligands; n may be from 1 to 3; and p may be from 1 to 3, provided that the sum of n+p equals the valence state of M, and further provided that two L ligands may be bridged for example by a silyl radical or a $C_{1-4}$ alkyl radical, or a mixture thereof.

9. The method of claim 1, wherein the α-olefin is present and is selected from propene, butene, hexene, and octene.

10. The method of claim 1, wherein the reactor is a single reactor.

11. The method of claim 1, further comprising a second polymerization reactor.

12. The method of claim 1, wherein the agitated reactor is selected from stirred tank, loop reactor static mixer, and static mixer in a loop.

13. The method of claim 1, wherein the reactor temperature is greater than about 110° C.

14. A method for fluid phase polymerizing a polyethylene polymer or copolymer comprising reacting a polymerization catalyst having an apparent activity between 20,000 $m^3$/kmole/sec and 500,000 $m^3$/kmole/sec with ethylene, optionally a $C_{3-12}$ α-olefin, and hydrogen in an agitated reactor wherein the reactor HUT/BT is greater than 4, reactor circulation ratio is between about 7 and about 2000, and the power/unit volume is less than 35 kW/$m^3$.

15. The method of claim 14, wherein the reactor HUT/BT is from about 7 to about 100.

16. The method of claim 14, wherein the reactor circulation ratio is from about 7 to about 1000.

17. The method of claim 14, wherein 1/the bulk Damkoehler number is between about 6 and about 150.

18. The method of claim 14, wherein the reactor circulation ratio is from about 7 to about 500 and reactor HUT/BT is from about 4 to about 7 and 1/bulk Damkoehler number is from about 3 to about 50.

19. The method of claim 14, wherein the power(to operate the agitator)/unit volume (of the reactor) is less than 30 kW/m3.

20. The method of claim 14, wherein the catalyst is a single site catalyst.

21. The method of claim 14, wherein the catalyst comprises a single site catalyst of the formula:

$(L)_n$-M-$(Y)_p$ wherein M is selected from Ti, Zr and Hf; L is a monoanionic ligand independently selected from cyclopentadienyl-type ligands, and a heteroatom ligand containing not less than five atoms in total and further containing at least one heteroatom selected from boron, nitrogen, oxygen, phosphorus, sulfur and silicon, said heteroatom ligand being sigma or pi-bonded to M, Y is independently selected from activatable ligands; n may be from 1 to 3; and p may be from 1 to 3, provided that the sum of n+p equals the valence state of M, and further provided that two L ligands may be bridged for example by a silyl radical or a $C_{1-4}$ alkyl radical, or a mixture thereof.

22. The method of claim 14, wherein the α-olefin is present and is selected from propene, butene, hexene, and octene.

23. The method of claim 14, wherein the reactor is an agitated reactor.

24. The method of claim 14, wherein the reactor is an agitated reactor selected from stirred tank, loop reactor static mixer, and static mixer in a loop.

25. The method of claim 14, wherein the reactor temperature is greater than about 110° C.

* * * * *